(12) United States Patent
Fuchs et al.

(10) Patent No.: US 6,382,806 B1
(45) Date of Patent: May 7, 2002

(54) OUTSIDE REAR VIEW MIRROR WITH POSITION SENSOR

(75) Inventors: Hans-Joachim Fuchs, Holland, MI (US); Peter Fuerst, Bürgstadt; Klaus Schnellbach, Freudenberg, both of (DE)

(73) Assignee: Donnelly Hohe GmbH & Co. KG (DE)

( * ) Notice: Subject to any disclaimer, the term of this patent is extended or adjusted under 35 U.S.C. 154(b) by 0 days.

(21) Appl. No.: 09/699,084

(22) Filed: Oct. 27, 2000

(30) Foreign Application Priority Data

Nov. 2, 1999 (DE) .......................... 199 52 812

(51) Int. Cl.⁷ .............................................. G02B 7/182
(52) U.S. Cl. .................... 359/877; 358/878; 358/871; 358/214
(58) Field of Search ................................ 359/877, 878, 359/871, 872, 843, 212, 213, 214, 814, 196; 250/207.2, 347, 348

(56) References Cited

U.S. PATENT DOCUMENTS

| | | | |
|---|---|---|---|
| 4,726,640 A | * | 2/1988 | Iwama et al. ............... 359/214 |
| 5,085,504 A | | 2/1992 | Jensen |
| 5,177,631 A | * | 1/1993 | Orlicki et al. ............... 359/214 |

FOREIGN PATENT DOCUMENTS

| | | |
|---|---|---|
| DE | 19812689 A1 | 10/1998 |
| DE | 19841551 A1 | 4/2000 |
| DE | 19928384 A1 | 1/2001 |
| EP | 0895898 A2 | 2/1999 |

OTHER PUBLICATIONS

U.S. application No. 09/597,678, Fuerst et al., filed Feb. 6, 2001.

* cited by examiner

Primary Examiner—Mohammad Sikder
(74) Attorney, Agent, or Firm—McGlew and Tuttle, P.C.

(57) ABSTRACT

An outside rear view mirror for a motor vehicle is provided having an adjustably supported glass subassembly and an electric adjusting mechanism for remote-controlled adjustment of the glass subassembly. The position of the glass subassembly, in particular the angular position, is determinable by means of at least one sensor. In order to enable contactless and wear-free acquisition of the position of the glass subassembly, the sensor is designed in the manner of a magnetic sensor, which cooperates in such a way with a magnetic element provided in the outside rear view mirror that the magnetic sensor or the magnetic element participates in the adjusting motion of the glass subassembly. The magnetic sensor in dependence upon the position of the magnetic element supplies a variable output signal, from which in an evaluation unit the position of the glass subassembly is derivable.

24 Claims, 3 Drawing Sheets

Unipolar Head-on

Bipolar Slide-by (1 Magnet)

Unipolar Slide-by

Bipolar Slide-by (2 Magnets)

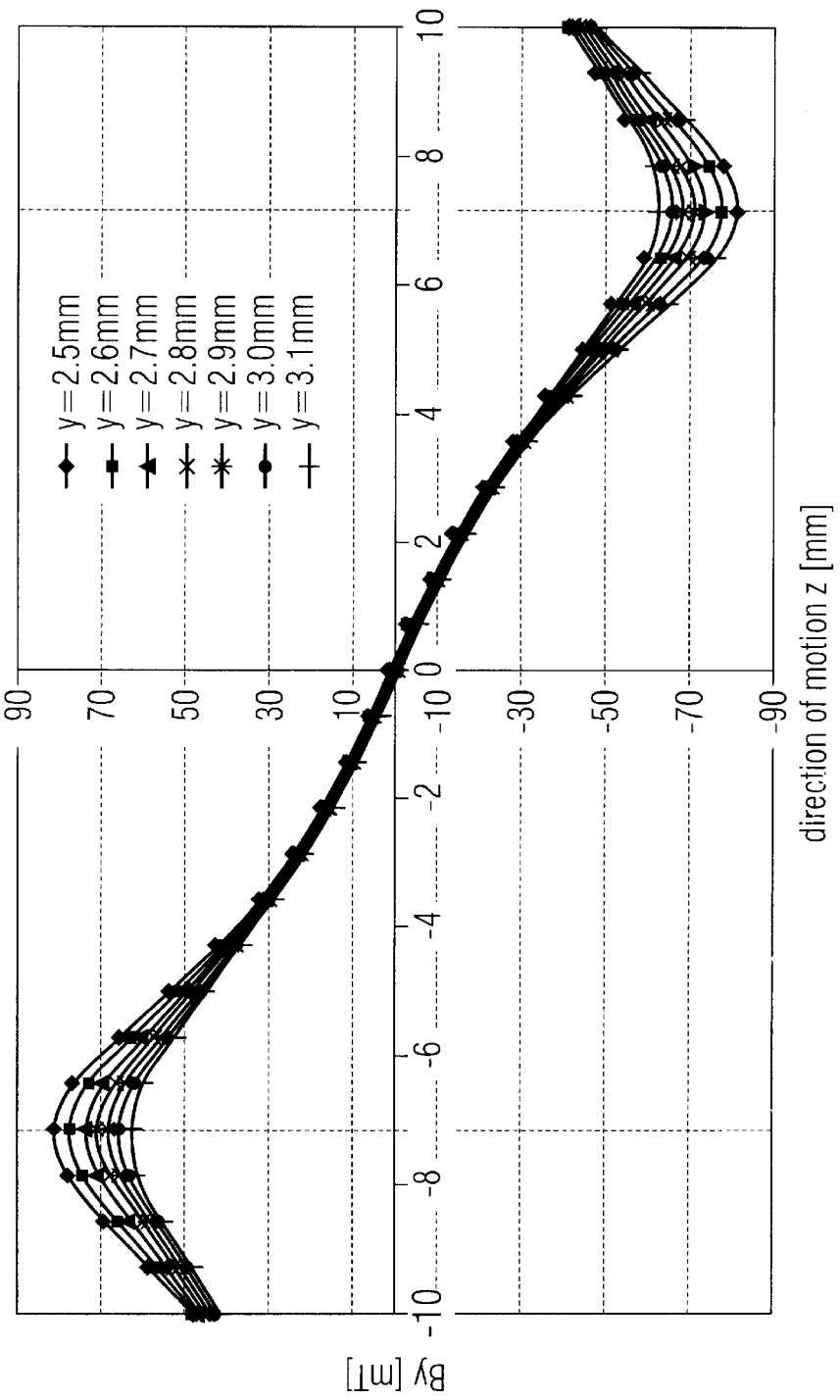

OUTSIDE REAR VIEW MIRROR WITH POSITION SENSOR

FIELD OF THE INVENTION

The invention relates to an outside rear view mirror for motor vehicles having an adjustably supported glass subassembly and an electric adjusting mechanism for remote-controlled adjustment of the glass subassembly, wherein the position of the glass subassembly, in particular the angular position, is determinable by means of at least one sensor.

BACKGROUND OF THE INVENTION

Outside rear view mirrors of the type described above are known from prior art. Such outside rear view mirrors comprise an adjusting mechanism for adjusting the mirror glass, which is provided on the glass subassembly. The driver is therefore able by remote control to adapt the glass subassembly of the outside rear view mirror to his individual requirements. More prestigious vehicles have a so-called memory function. For such memory function specific settings, e.g. of the driver's seat and in particular also of the outside rear view mirrors, are stored so that, after a change of driver, the memory function merely has to be tripped for the seat and/or the outside rear view mirrors to be brought into the correct setting for the driver. For such functions, the position of the glass subassembly has to be detectable by means of a sensor in order to store the various setting values for the various drivers after the initial start-up and enable start-up upon subsequent tripping of the memory function.

From prior art so-called memory potentiometers are known, which are fitted in outside rear view mirrors as sensors for determining the position of the glass subassembly. Depending on the position of the glass subassembly, corresponding voltage output values associated with an angular position arise at the memory potentiometer. For this purpose, the potentiometers fitted e.g. in the glass adjusting mechanisms are supplied with an input voltage of e.g. 5 V DC. Depending on the position of the glass subassembly, an output voltage of between 5% and 95% of the applied input voltage may then be tapped at the memory potentiometers. From the voltage drop between input voltage and output voltage it is to therefore possible to derive the position of the glass subassembly.

The drawback of the known sensors for determining the position of the glass subassembly in an outside rear view mirror is that their functioning may be impaired by corrosion. As soon as water, especially combined with salt, penetrates the outside mirror, the sensitive resistive lines or sliders of the memory potentiometers may become damaged and therefore cause failures of the memory function.

SUMMARY AND OBJECTS OF THE INVENTION

The object of the present invention is to provide an outside rear view mirror, in which the position of the glass subassembly is determinable by means of a sensor which is insensitive to corrosion.

This object is achieved by an outside rear view mirror having an adjustably supported glass subassembly and an electric adjusting mechanism for remote-controlled adjustment of the glass subassembly, wherein the position of the glass subassembly, in particular the angular position, is determinable by means of at least one sensor. The sensor is designed in the manner of a magnetic sensor, which cooperates in such a way with a magnetic element provided in the outside rear view mirror that the magnetic sensor or the magnetic element participates in the adjusting motion of the glass subassembly and the magnetic sensor in dependence upon the position of the magnetic element supplies a variable output signal, from which in an evaluation unit the position of the glass subassembly is derivable.

The invention is based on the fundamental idea of using a sensor which operates without contact to determine the position of the glass subassembly. It has in such case proved a particularly suitable operating principle to use the variation of the magnetic field strength as a function of the arrangement of a measuring point in a magnetic field to measure the position of the glass subassembly in the agreed manner.

According to the invention it is therefore proposed to design the sensor in the manner of a magnetic sensor, which in the outside rear view mirror cooperates with a magnetic element, i.e. a component surrounded by a magnetic field, e.g. a permanent magnet, in such a way that the magnetic sensor or the magnetic element participates in the adjusting motion of the glass subassembly, with the result that the adjustment of the glass subassembly gives rise to a relative movement between magnetic sensor and magnetic element. The magnetic sensor is consequently moved in the magnetic field of the magnetic element and is therefore exposed, depending on the position of the glass subassembly, to different field intensities in the magnetic field of the magnetic element. Depending on the respective field intensity the magnetic sensor supplies a variable output signal, wherein a specific position of the glass subassembly is associated with the output signal so that by evaluation of the output signal in an evaluation unit the position of the glass subassembly is derivable. Thus, a reliable sensor is available for non-contact measurement of the position of the glass subassembly. In principle, it is of no importance to the function of the invention whether the magnetic sensor or the magnetic element participates in the adjusting motion of the glass subassembly. As in many cases it will admittedly be easier to arrange the magnetic sensor in a fixed manner and the magnetic element in a movable manner, the following description is based on this type of arrangement. The reverse arrangement is however likewise realizable without difficulty.

The magnetic sensor may, in principle, be of any desired design so long as it generates an output signal which varies with the change of position of the magnetic element in the magnetic field. For example, the use of GMR sensors, magnetoresistors or magnetoresistive sensors is conceivable. Particularly suitable are so-called Hall-effect sensors because said type of sensor is already commercially available at low cost together with correspondingly suitable magnetic elements, e.g. permanent magnets obtained by vacuum melting. Hall-effect sensors present good spatial resolution even with low positioning motion amplitudes.

In order to evaluate the output signal of the magnetic sensor, the output signal has to be relayed to an evaluation unit, e.g. the central processing unit in a motor vehicle. In order to guarantee reliable signal transfer even in the event of extended conductor paths, it is advantageous for the output signal to have a relatively high voltage level. It is therefore to advantageous to integrate a signal amplifying circuit in the magnetic sensor so that the output signals may be proportionally boosted. It is further advantageous for the magnetic sensor to comprise a temperature compensating circuit so that the measurement result is not corrupted by temperature influences.

It is particularly advantageous when the magnetic sensor may be supplied with a supply voltage of around 5 V DC as said supply voltage has also already been used previously for supplying the known sensors, so that there is no need to adapt the supply voltage to the new magnetic sensors. However, in principle any other supply voltage is also conceivable so long as it may be made available in the vehicle.

It is furthermore advantageous when the magnetic sensor in dependence upon the position of the magnetic element produces an output voltage in the voltage range of 5% to 95% of the supply voltage because said voltage range likewise corresponds to the previously used voltage range, with the result that the previously used evaluation units may continue to be used substantially without modification. However, in principle any other voltage range is also conceivable so long as it enables an adequate accuracy of the measuring signals over the positioning range.

In principle, the use of any magnetic element which builds up a magnetic field is conceivable in the outside rear view mirror according to the invention. For example, it is also possible to use magnetic elements, in which a magnetic field is generated by the flux of a specific electric current. Particularly inexpensive are magnetic elements designed in the manner of permanent magnets. Permanent magnets are also advantageous because they do not have to be supplied with energy from outside and are therefore extremely reliable. In the present case, use should be made of permanent magnets having magnetic properties, which at any rate vary only slightly within the average life of a motor vehicle.

Particularly suitable for use in the outside rear view mirror according to the invention are magnetic elements which as a whole have a bar-shaped geometry, wherein the north and south poles of the magnetic element are disposed one at either end of the magnetic bar.

For generating magnetic fields having specific advantageous properties, it is advantageous when the magnetic element is composed of a plurality of magnetic sub-elements. By purposeful combination of various of the latter, which may present e.g. different magnetic properties and/or different orientations, it is possible to generate a magnetic field which may be evaluated particularly well by the magnetic sensor. Said type of composition of the magnetic element from a plurality of magnetic sub elements is particularly advantageous in the case of lower piece numbers where manufacture of a one-piece magnetic element, the properties of which are specified for the special rear view mirror, is uneconomical because of the fixed-cost component. For larger-series production it is however naturally also possible for a correspondingly specified magnetic element, e.g. a permanent magnet, to be formed from one piece and magnetized in accordance with the required magnetic properties.

The combination of magnetic sensors with magnetic elements for determining a relative position between magnetic sensor and magnetic element may be operated in various known operating modes. For example, the unipolar head-on operating mode is known, whereby the one pole of a permanent magnet is moved up to the magnetic sensor head-on. In said case, however, the output signal of the magnetic sensor does not vary linearly with the distance of the magnetic pole from the magnetic sensor. Rather, the output signal, as the distance of the magnetic pole from the magnetic sensor increases, asymptotically approaches the zero point so that at least in said measuring range there is poor resolution of the positioning motion with said operating mode.

Also known is the unipolar slide-by operating mode, whereby the one pole of a permanent magnet lies at a specific distance opposite the magnetic sensor and during the positioning motion is conveyed past the magnetic sensor parallel to the magnetic sensor at a constant distance y. With said operating mode, the output signal reaches a maximum as soon as the permanent magnet lies directly opposite the magnetic sensor. In the positioning range of the permanent magnet, starting from said position with a maximum output signal, the output signal does not vary linearly but drops underproportionally slightly. As a result, in the positioning range around the maximum of the output signal no good resolution of the positioning motion is possible with said operating mode either.

Particularly suitable for the purpose according to the invention is the bipolar slide-by operating mode. With said operating mode, use is made of a magnetic element comprising at least two magnetic portions, e.g. two magnetic sub-elements. As with the unipolar slide-by operating mode, the magnetic element is disposed at a specific distance y opposite the magnetic sensor and then during measurement is displaced at a constant distance y parallel to the magnetic sensor. With the bipolar slide-by operating mode, the output signal assumes the reference value for the zero position as soon as the magnetic element lies at the shortest possible distance opposite the magnetic sensor. From this point the output signal rises linearly in the one direction or drops linearly in the opposite direction. The gradient of the linear measuring signal range may in said case be influenced by the distance between the two portions of the magnetic element of reverse polarity. The greater the distance between the two portions, the lower the gradient of the measuring signal in the linear measuring range.

Given the use of a magnetic sensor with associated magnetic element in the bipolar slide-by operating mode, the measuring range of the magnetic to sensor is selected in just such a way that the positioning motion of the glass subassembly to be measured falls precisely in the linear range of the output signal shape. The effect is thereby achieved that the positioning motion may be imaged with substantially the same resolution over the entire positioning range.

In principle, it does not matter whether the magnetic sensor or the magnetic element participates in the adjusting motion of the glass subassembly because for determination of the position of the glass subassembly it is immaterial whether the magnetic sensor moves relative to the magnetic element or the magnetic element moves relative to the magnetic sensor. It is however advantageous when the magnetic sensor is disposed in a fixed manner on a basic body of the outside rear view mirror, e.g. an amplifier plate, and the magnetic element participates in the adjusting motion of the glass subassembly. For, should damage be caused to the outside rear view mirror by external influences such as an accident, in most cases only the glass subassembly and the adjusting mechanism are damaged to such an extent as to require replacement. By virtue of the fixed arrangement of the magnetic sensor it is therefore possible in most cases to avoid the need to replace the magnetic sensor following damage to the outside rear view mirror. Admittedly, in most cases the magnetic element will have to be replaced instead but this involves considerably less expense because of the lower component price for the magnetic element and the lower assembly outlay, especially in the case of permanent magnets which do not require cabling.

When the combination of magnetic sensor and magnetic element is operated in the bipolar slide-by operating mode, it is, as described, necessary for the magnetic element to be displaced at a substantially constant distance parallel to the magnetic sensor. Given the fixed arrangement of the magnetic sensor on a basic body, it is therefore advantageous when the basic body in the region of the magnetic sensors has indentations or recesses, into which the magnetic element may penetrate to a differing depth in dependence upon the position of the glass subassembly. When the magnetic sensor is disposed on a printed-circuit board or the like which is in turn fastened to the basic body, the printed-circuit board also has to have correspondingly arranged recesses so that it may be penetrated by the magnetic elements. In other words, the magnetic sensor may be disposed at a specific height on or in the basic body and by virtue of the indentation or recess in the basic body the magnetic element has sufficient margin for it to be displaced over the entire positioning range parallel to the magnetic sensor. By virtue of the geometry of the indentation or recess, moreover, guidance of the magnetic element relative to the magnetic sensor may be achieved. This is possible e.g. by virtue of the recess having an only slightly larger diameter than the magnetic element.

Especially given operation of the magnetic sensor in the bipolar slide-by operating mode, the magnetic element has to be arranged so as to be displaceable at a substantially constant distance y parallel to the magnetic sensor during the adjusting motion of the glass subassembly.

To enable accommodation of the measuring system according to the invention in the smallest possible installation space, it is advantageous for the magnetic element to be integrated in the adjusting mechanism.

It is therefore particularly advantageous in cases where the adjusting mechanism comprises a gear element, in particular a gear rack or worm plunger, by means of which a positioning motion is transmissible to the glass subassembly, to design and dispose the magnetic element in such a way that it participates in the positioning motion of the gear element. Each time a positioning motion is transmitted by the gear element the magnetic element is carried along, so that by said means the adjustment of the glass subassembly may be indirectly measured. With each position of the gear element, as a rule, one position of the glass subassembly is clearly associated. For realizing said operating principle it is, for example, conceivable to fasten the magnetic element to the end of the gear element, in particular to the end of a gear rack or to the end of a worm plunger. Thus, by simple means it becomes possible to use already serially employed adjusting mechanisms for the sensor system according to the invention simply by adding the magnetic element onto the existing gear element.

Given the use of permanent magnets made of metal materials, e.g. iron, as a magnetic element, it is necessary to rule out corrosion of the permanent magnet for the long term because the magnetic properties of the magnetic element would vary as a result of corrosion, with the result that reliable operation of the sensor system according to the invention would not be guaranteed under all circumstances. In a particularly advantageous manner the corrosion protection of the magnetic element may be guaranteed when, for manufacture of the gear element used in the adjusting mechanism to transmit a positioning motion to the glass subassembly, a magnetic element, preferably a permanent magnet, is extrusion-coated with plastics material. Such measure guarantees reliable corrosion protection of the magnetic element because the entire surface of the magnetic element is enveloped in plastics material. Furthermore, the spatial requirement of the magnetic element may be substantially eliminated because it is fully integrated in the gear element, which is to be provided in any case. In terms of methodology, such gear elements with an embedded magnetic element may be manufactured, e.g. by insert molding. The end result is a multi-functional part which may be used simultaneously as a magnetic element and a gear element.

An even more advantageous possibility of manufacturing a gear element with an integrated magnetic element is when the gear element is creatively formed using a magnetizable material. For example, the gear element may be die-cast from a magnetizable metal material. It is even more advantageous, however, when the gear element is manufactured by injection molding using a plastics material, which contains a plastic bound magnetic material. The end result is therefore a gear element made of plastics material having the known advantages of plastics material, such as, e.g. low weight and high wear resistance, which at the same time, because it contains magnetic material, e.g. neodymium-iron-boron, is magnetizable in such a way as to be usable as a permanent-magnet magnetic element. As such materials are processable by injection molding, they are also inexpensive to manufacture. After shaping, e.g. by injection molding, the finished gear elements are magnetized in a defined manner.

In many cases considerable demands are placed upon the gear element, e.g. a gear rack or worm plunger, in terms of mechanical stability and wear resistance. Said demands may occasionally be met only with difficulty by plastics materials containing plastic-bound magnetic materials. It is therefore advantageous when the gear element is manufactured in a multicomponent injection molding process, whereby a plastics material containing a plastic-bound magnetic material is extrusion-coated with another plastics material. This allows the core of the gear element to be manufactured from magnetizable material, while the outer regions of the gear element may be manufactured from a highly stable and/or wear-resistant plastics material.

For contacting of the magnetic sensor, it is advantageous to use printed conductors which are extrusion-coated with plastics material, in the manner described, e.g. in DE 198 41 551. The electric lines used for contacting the magnetic sensors may be provided, e.g. by insert molding in an amplifier plate. It is also conceivable to design the printed conductors as a pressed screen or lead frame, on which the magnetic sensor is contacted and then together with the pressed screen extrusion-coated with plastics material. Also conceivable is the use of multicomponent injection molding processes for manufacturing the amplifier plate with partial metal-plating of plastic components for producing printed conductors or foil-type printed-circuit boards, rigid printed-circuit boards or conventional circular conductors.

As with the sensor system according to the invention position measurement is effected without contact, the magnetic sensor as a protection against corrosion may be extrusion-coated with plastics material or encapsulated in a sealing compound, in particular silicone. Alternatively, the magnetic sensor as a protection against corrosion may be disposed in a sealable dry chamber of the outside rear view mirror, such as is described e.g. in DE 199 28 384.

For application of the measuring principle according to the invention in most outside rear view mirrors it is necessary to provide two magnetic sensors and two magnetic elements disposed in a functionally complementary manner thereto. Each combination of magnetic sensor and magnetic element then measures the angular position of the glass subassembly relative to a respective swivelling axis.

The various features of novelty which characterize the invention are pointed out with particularity in the claims annexed to and forming a part of this disclosure. For a better

BRIEF DESCRIPTION OF THE DRAWINGS

In the drawings:

FIG. 4 is a diagram showing the magnetic flux density of a magnetic element as a function of the magnet position relative to a reference point.

DESCRIPTION OF THE PREFERRED EMBODIMENTS

Figure 1:
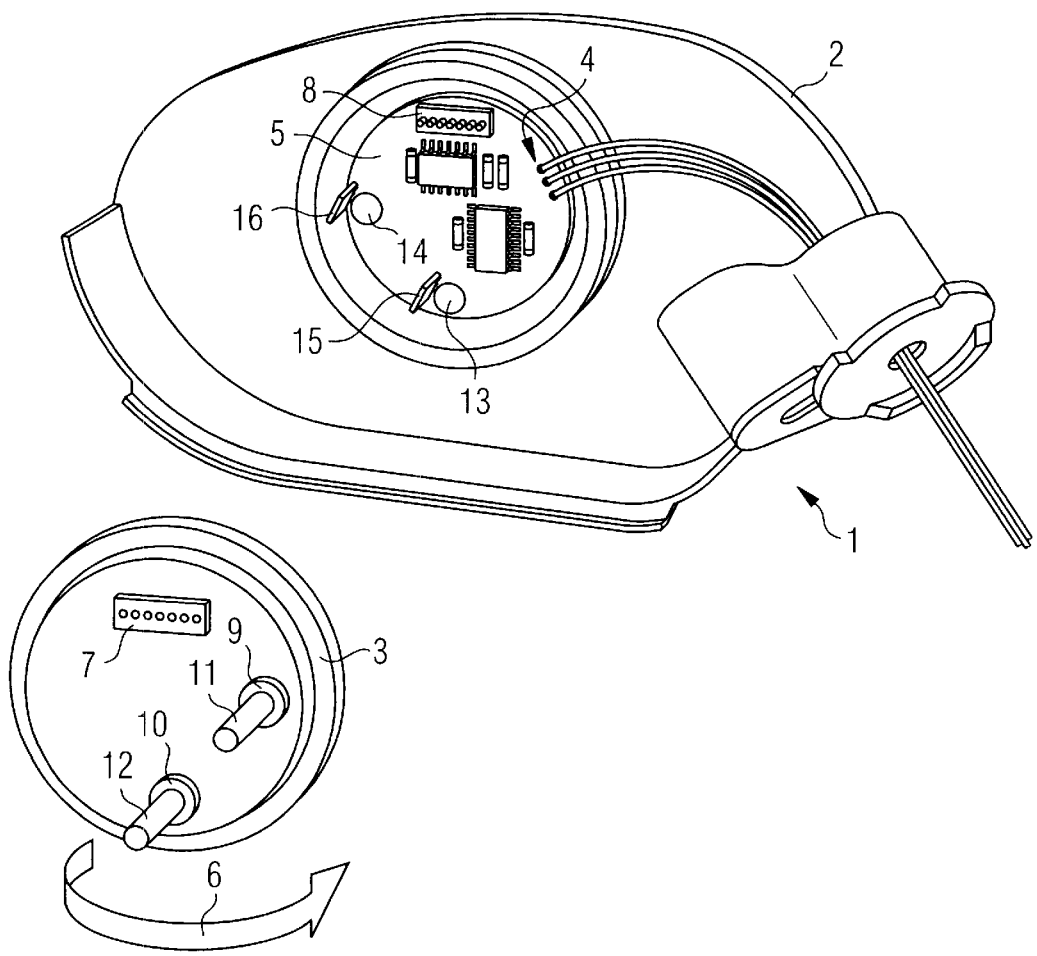
FIG. 1 is a perspective view of an outside rear view mirror.

Referring to the drawings in particular, FIG. 1 shows an outside rear view mirror 1 with a carrier plate 2 and an adjusting mechanism 3. Components of the outside rear view mirror 1 which are of no importance to an understanding of the invention are not shown in FIG. 1.

Provided on the carrier plate 2 is a sealed chamber 4, which may be sealed in a waterproof manner by mounting the adjusting mechanism 3 like a cover at the open side of the sealed chamber 4. A printed-circuit board 5, on which various electronic components are fitted, is provided in the sealed chamber 4.

In FIG. 1 only the rear of the adjusting mechanism 3 is visible. For mounting the adjusting mechanism 3 on the carrier plate 2, the adjusting mechanism 3 is turned in accordance with the movement arrow 6 to allow the multipole connector 7 to be brought into engagement with the functionally complementary multipole connector 8 and then fastened.

Two positioning motors are disposed at the front (not illustrated in FIG. 1) of the adjusting mechanism 3. The positioning motors function in the manner known from prior art, via two gear racks 9 and 10, of which only the end remote from the glass subassembly is visible in FIG. 1, to drive a non illustrated glass subassembly in two positioning planes.

Fastened to the end of the gear racks 9 and 10 remote from the glass subassembly there is, in each case, a bar-shaped permanent-magnet to magnetic element 11 and 12. The magnetic elements 11 and 12 therefore participate in the positioning motions of the gear racks 9 and 10 during adjustment of the non-illustrated glass subassembly. In the printed-circuit board 5 and in the carrier plate 2 beneath it, two recesses 13 and 14 (printed-circuit board S) and two non-illustrated indentations (carrier 15 plate 2) are provided so that the magnetic elements 11 and 12 during adjustment of the glass subassembly may engage, without resistance and guided by the edge of the recesses 13 and 14, into the carrier plate 2. Provided at the edge of each of the recesses 13 and 14 is a magnetic sensor 15 and 16, which are contacted via the printed-circuit board 5 with an evaluation unit 17. The arrangement of the magnetic elements 11 and 12 as well as of the magnetic sensors 15 and 16 allows the position of the glass subassembly relative to the two provided swivelling axes to be determined through operation of the magnetic sensors in the bipolar slide-by operating mode.

Figure 2:
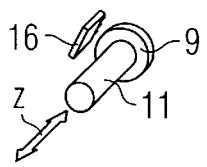
FIG. 2 is a perspective view of the cooperation of a magnetic sensor and a magnetic element in an outside rear view mirror according to Fig.

FIG. 2 shows the arrangement of the magnetic element 11 relative to the magnetic sensor 16, which is designed in the manner of a Hall-effect sensor, after mounting of the adjusting mechanism 3. It is evident that the magnetic element 11 during the linear positioning motion of the gear rack 9 in the Z direction is displaced at a constant distance from the magnetic sensor 16 parallel to the latter.

Figure 3A:
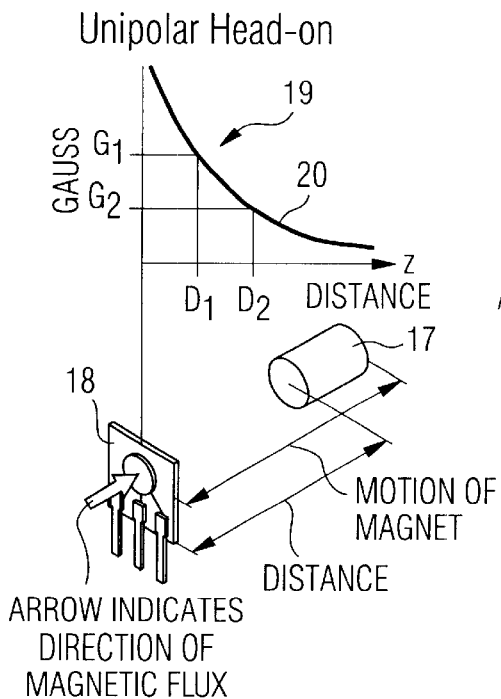
FIG. 3A is a diagram showing an operating mode of magnetic sensor systems.

FIGS. 3A to 3D show four operating modes of a combination of a magnetic element with a magnetic sensor, wherein as an input variable the relative position between the magnetic element and the magnetic sensor and, as an output signal, an output voltage of the magnetic sensor is provided. FIG. 3A shows the unipolar head-on operating mode, whereby the magnetic element 17 approaches the magnetic sensor 18 head on. The diagram 19 shows the shape of the output signal 20 over the distance between magnetic sensor 18 and magnetic element 17 plotted as the Z axis. It may be seen that the output signal 20 with increasing distance to between magnetic element 17 and magnetic element 18 asymptotically approaches the zero value, with the result that positioning motions in said range may be resolved only inadequately.

Figure 3B:
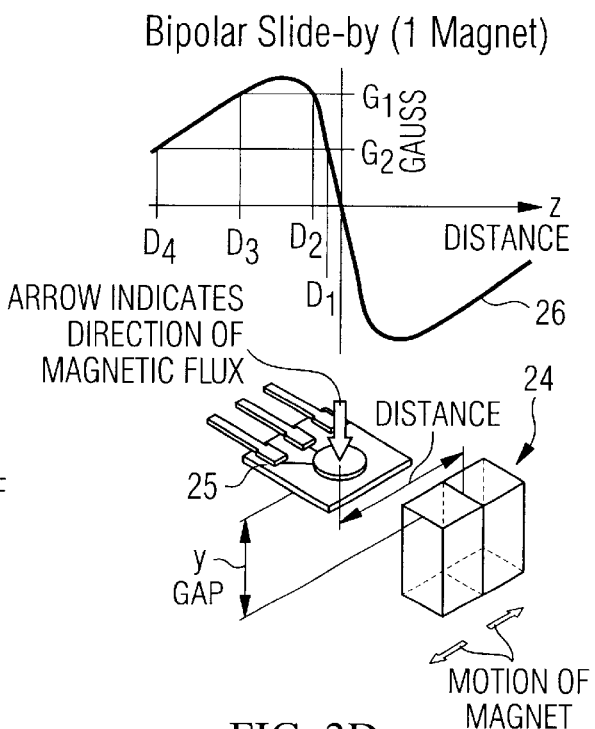
FIG. 3B is a diagram showing another operating mode of magnetic sensor systems.
Figure 3C:
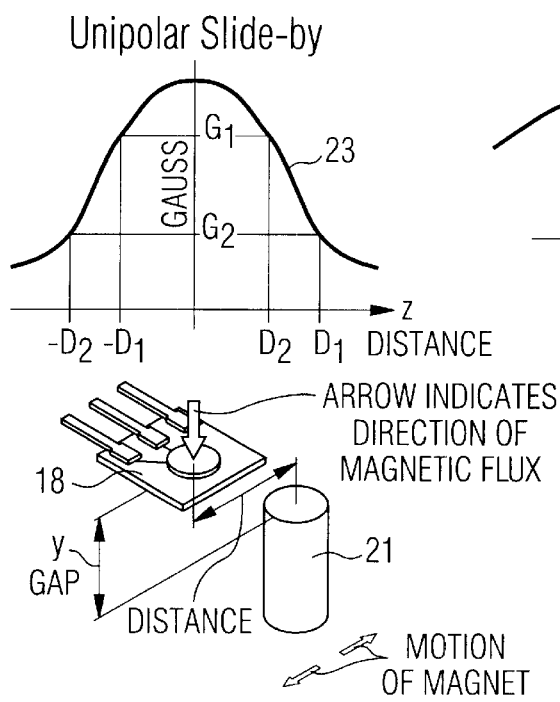
FIG. 3C is a diagram showing another operating mode of magnetic sensor systems.

FIG. 3C shows the combination of a magnetic element 21 with a magnetic sensor 22 in the unipolar slide-by operating mode. In this operating mode the magnetic element 21 is conveyed at a constant distance y past the magnetic sensor and parallel thereto. In such case, as the magnetic element 21 approaches the magnetic sensor, the output signal 23 of the magnetic sensor rises in the shape of a curve and reaches a maximum as soon as the magnetic element 21 lies opposite and at the minimum distance from the magnetic sensor 22. From the maximum of the output signal, the output signal upon further displacement of the magnetic element 21 then drops again. It is evident that the curve of the output signal 23 in the region of the maximum has only a very slight slope, which is why movements by the combination of the magnetic element 21 with the magnetic sensor 22 in the unipolar slide-by operating mode may be only poorly resolved in the region of the output signal maximum.

FIG. 3B shows the combination of a magnetic element 24 with a magnetic sensor 25 in a bipolar slide-by operating mode. It is evident that the magnetic element 24 comprises two portions, which are designed to be of opposite magnetic polarity. Consequently, both a south pole and a north pole of the magnetic element 24 lie opposite the magnetic sensor 25. For the measurement of movements, the magnetic element 24 is conveyed past the magnetic sensor 25 at a constant distance y parallel to the magnetic sensor 25. This gives rise to an output signal curve 26. The output signal 26 presents a linear slope around the zero point, which is reached when the magnetic element 24 lies directly opposite the magnetic sensor 25. From a specific distance of the magnetic element 24 from the magnetic sensor 25 on, the slope of the output curve 26 drops and reaches an absolute maximum and/or an absolute minimum. Thus, for measurement of the position of the glass subassembly through the use of a combination of a magnetic sensor with a magnetic element the bipolar slide-by operating mode is particularly suitable because movements, which lead to changes of the distance between the magnetic element 24 and the magnetic sensor 25, may be resolved uniformly well in the region between the absolute maximum and the absolute minimum because of the uniform slope. When designing the magnetic sensor, it should be noted that it is advantageous when, given maximum deflection of the glass subassembly in the one or the opposite direction an adequate distance of the output signal of the magnetic sensor from the absolute maximum and/or the absolute minimum is still guaranteed.

Figure 3D:
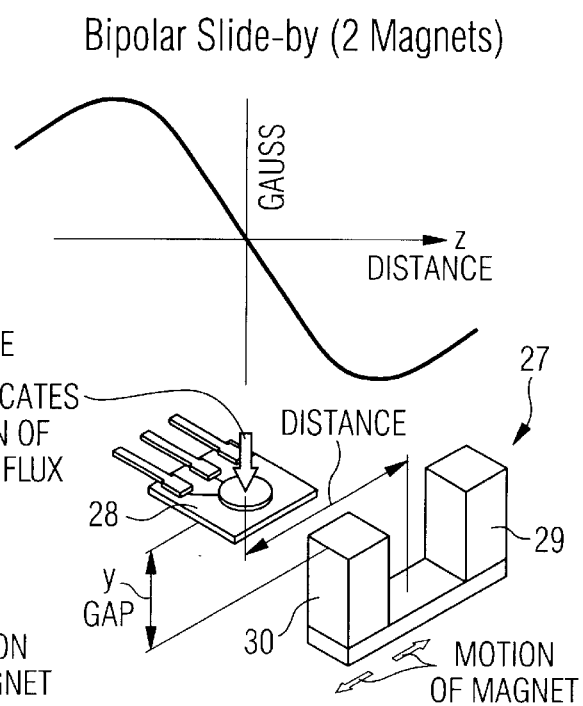
FIG. 3D is a diagram showing another operating mode of magnetic sensor systems.

FIG. 3D shows the combination of a magnetic element 27 with a magnetic sensor 28 in the bipolar slide-by operating mode, wherein the magnetic element 27 comprises two separate magnets 29 and 30, which are at a specific distance from one another and are of opposite polarity. The output signal 31 of the magnetic sensor 28 in said operating mode corresponds qualitatively to the output signal shape of the output signal 26. It is evident that, by varying the distance between the magnetic sub-elements 29 and 30, the slope of the output signal curve may be varied.

FIG. 4 shows the magnetic flux density in [mT] of a magnetic element as a function of the magnet position relative to a reference point upon movement of the magnetic element in direction of motion z in [mm]. In FIG. 4 seven curves of the magnetic flux density are plotted for different distances y in [mm]. It is evident that the magnetic flux density during the movement of the magnetic element in the region of the zero point varies almost linearly with the value of z. The diagram moreover shows that the magnetic flux density in the region around the zero point varies only slightly with variation of the distance y.

While specific embodiments of the invention have been shown and described in detail to illustrate the application of the principles of the invention, it will be understood that the invention may be embodied otherwise without departing from such principles.

What is claimed is:

1. An outside rear view mirror for a motor vehicle, the outside rear view mirror having an adjustably supported glass subassembly, the outside rear view mirror comprising:
   an electric adjusting mechanism for remote-controlled adjustment of the position of the glass subassembly;
   a glass subassembly position sensor for determining the position of the glass subassembly, said glass subassembly position sensor including a magnetic sensor and a cooperating magnetic element;
   said glass subassembly including one of said magnetic sensor and said magnetic element, said one of said magnetic sensor and said magnetic element moving with said glass subassembly during an adjustment of the position of the glass subassembly by said electric adjusting mechanism;
   the other of said magnetic sensor and said magnetic element fixedly included in said outside rear view mirror at a location other than said glass subassembly, said other of said magnetic sensor and said magnetic element remaining fixed when said one of said magnetic sensor and said magnetic element moves during an adjusting motion of the glass subassembly by said electric adjusting mechanism; and
   said glass subassembly position sensor supplying a variable output signal indicative of said adjusting motion of the glass subassembly from which an evaluation unit can derive a position of the glass subassembly.

2. An outside rear view mirror according to claim 1, wherein said magnetic sensor is a Hall-effect sensor.

3. An outside rear view mirror according to claim 1, wherein said magnetic sensor comprises a signal amplifying and/or temperature compensating circuit.

4. An outside rear view mirror according to claim 1, wherein said magnetic sensor is supplied with a supply voltage of around 5 V DC.

5. An outside rear view mirror according to claim 1, wherein the magnetic sensor in dependence upon the position of the magnetic element produces an output voltage in the voltage range of 5% to 95% of the supply voltage.

6. An outside rear view mirror according to claim 1, wherein the magnetic element is a permanent magnet.

7. An outside rear view mirror according to claim 1, wherein the magnetic element has an, on the whole, a bar-shaped geometry.

8. An outside rear view mirror according to claim 1, wherein the magnetic element includes a plurality of magnetic sub-elements.

9. An outside rear view mirror according to claim 1, wherein the magnetic sensor and the magnetic element are designed and disposed in such a way that the position of the magnetic element relative to the magnetic sensor is determinable in a bipolar slide-by operating mode.

10. An outside rear view mirror according to claim 1, wherein the magnetic sensor is disposed in a fixed manner on a basic body of the outside rear view mirror and the magnetic element participates in the adjusting motion of the glass subassembly.

11. An outside rear view mirror according to claim 10, wherein the basic body has in the region of the magnetic sensor indentations or recesses, into which the magnetic element may penetrate to a differing depth in dependence upon the position of the glass subassembly.

12. An outside rear view mirror according to claim 1, wherein the magnetic element is disposed in such a way that it is displaced, during the adjusting motion of the glass subassembly, at a substantially constant distance parallel to the magnetic sensor.

13. An outside rear view mirror according to claim 1, wherein the magnetic element is integrated in said electric adjusting mechanism.

14. An outside rear view mirror according to claim 13, wherein the adjusting mechanism comprises a gear element including one of a gear rack and a worm plunger, by means of which a positioning motion is transmissible to the glass subassembly, wherein the magnetic element participates in the positioning motion of the gear element.

15. An outside rear view mirror according to claim 14, wherein the magnetic element is fastened to the end of the gear element, in particular to the end of a gear rack or to the end of a worm plunger.

16. An outside rear view mirror according to claim 14, wherein for manufacture of the gear element a magnetic element is extrusion-coated with plastics material.

17. An outside rear view mirror according to claim 14, wherein the gear element is creatively formed using a magnetizable material.

18. An outside rear view mirror according to claim 17, wherein the gear element is manufactured by injection molding using a plastics material, which contains a plastic-bound magnetic material.

19. An outside rear view mirror according to claim 18, wherein the gear element is manufactured using a multi-component injection molding process, whereby a plastics material, which contains a plastic-bound magnetic material, is extrusion-coated with another plastics material.

20. An outside rear view mirror according to claim 1, wherein the magnetic sensor is contactable by means of at least one printed conductor, which is extrusion-coated with plastics material.

21. An outside rear view mirror according to claim 1, wherein the magnetic sensor is extrusion-coated with plastics material.

22. An outside rear view mirror according to claim 1, wherein the magnetic sensor is encapsulated in one of a sealing compound and silicone.

23. An outside rear view mirror according to claim 1, wherein the magnetic sensor is disposed in a sealable chamber of the outside rear view mirror.

24. An outside rear view mirror according to claim 1, wherein the outside rear view mirror comprises two magnetic sensors and two magnetic elements disposed in a functionally complementary manner so that the angular position of the glass subassembly relative to an X axis and to a Y axis extending non-parallel thereto is determinable.

* * * * *